United States Patent
Raman et al.

(10) Patent No.: US 9,842,315 B1
(45) Date of Patent: Dec. 12, 2017

(54) SOURCE MOBILE DEVICE IDENTIFICATION FOR DATA LOSS PREVENTION FOR ELECTRONIC MAIL

(75) Inventors: Shree Raman, San Francisco, CA (US); Pushkar Tiwari, San Francisco, CA (US); Dirk Kessler, San Francisco, CA (US); Rohit Surve, San Francisco, CA (US)

(73) Assignee: Symantec Corporation, Mountain View, CA (US)

( * ) Notice: Subject to any disclaimer, the term of this patent is extended or adjusted under 35 U.S.C. 154(b) by 559 days.

(21) Appl. No.: 13/490,250

(22) Filed: Jun. 6, 2012

Related U.S. Application Data (60) Provisional application No. 61/590,730, filed on Jan. 25, 2012, provisional application No. 61/590,731, filed on Jan. 25, 2012, provisional application No. 61/590,732, filed on Jan. 25, 2012.

(51) Int. Cl.
G06Q 10/10 (2012.01)

(52) U.S. Cl.
CPC .................................. G06Q 10/107 (2013.01)

(58) Field of Classification Search
CPC .......... G06F 15/16; G06F 21/10; G06F 17/21; G06Q 10/107; H04L 63/20; H04L 63/10; H04L 29/06; H04L 12/585; H04L 51/12; H04L 67/02; H04L 63/168; H04L 67/30; H04L 63/1466; H04L 12/58; H04L 12/581; H04L 12/5855; H04W 12/06; H04W 4/02; H04W 12/08
USPC ........................................ 709/206; 379/93.01
See application file for complete search history.

(56) References Cited

U.S. PATENT DOCUMENTS

| | | | |
|---|---|---|---|
| 8,243,890 B2 * | 8/2012 | Jackson .................. | H04L 51/24 379/88.13 |
| 8,826,443 B1 * | 9/2014 | Raman .................. | G06F 11/004 726/26 |
| 2003/0172167 A1 * | 9/2003 | Judge ...................... | H04L 51/12 709/229 |
| 2005/0091355 A1 * | 4/2005 | Keohane ............. | H04L 63/0428 709/223 |
| 2006/0075051 A1 * | 4/2006 | Jain et al. ..................... | 709/206 |
| 2008/0263224 A1 * | 10/2008 | Gilhuly .................. | H04L 51/14 709/242 |
| 2010/0318623 A1 * | 12/2010 | Bloch .................. | G06Q 10/107 709/206 |

(Continued)

OTHER PUBLICATIONS

Exchange ActiveSync:ActiveSync Protocol; The exchange ActiveSync protocol allow mobile to send email., Author:Microsoft Corporation Initial Release :Dec. 3, 2008.*

(Continued)

*Primary Examiner* — Mehulkumar Shah
(74) *Attorney, Agent, or Firm* — Rory D. Rankin; Meyertons, Hood, Kivlin, Kowert & Goetzel, P.C.

(57) ABSTRACT

The sources of emails sent from mobile devices using wireless email protocols can be identified. In one embodiment, the invention includes receiving a simple mail transfer protocol (SMTP)-formatted email sent from a mobile device as an HTTP request. An SMTP-compliant header identifying the mobile device is examined, that was inserted into the HTTP request using information contained in one or more HTTP headers of the HTTP request. Then, an email data loss prevention (DLP) policy specific to mobile devices is applied to the received email.

18 Claims, 5 Drawing Sheets

(56) References Cited

U.S. PATENT DOCUMENTS

| | | | |
|---|---|---|---|
| 2012/0094637 A1* | 4/2012 | Jeyaseelan | H04L 12/5805 455/412.2 |
| 2012/0106366 A1* | 5/2012 | Gauvin | H04L 43/0835 370/252 |
| 2014/0007183 A1* | 1/2014 | Qureshi | G06F 21/10 726/1 |

OTHER PUBLICATIONS

MIME:Wikipedia (NPL document).*

* cited by examiner

SOURCE MOBILE DEVICE IDENTIFICATION FOR DATA LOSS PREVENTION FOR ELECTRONIC MAIL

RELATED APPLICATIONS

This patent application claims the benefit under 35 U.S.C. §119(e) of U.S. Provisional Application Nos. 61/590,730; 61/590,731; 61/590,732, all filed on Jan. 25, 2012, all of which are herein incorporated by reference.

TECHNICAL FIELD

Embodiments of the present invention relate to the field of data loss prevention, and more particularly, to a data loss prevention (DLP) system that inspects outbound organizational email from mobile devices.

BACKGROUND

Many organizations implement data loss prevention (DLP) systems to identify and control access to sensitive data. Typical DLP systems protect sensitive data through deep content inspection and analysis, which includes describing technology and fingerprinting technology. Describing technology protects sensitive data by identifying matches to keywords, expressions or patterns, and file types, and by performing other signature-based detection techniques. Fingerprinting technology protects sensitive data by identifying exact matches to whole or partial files. When sensitive data is identified, it can be addressed according to DLP policies.

The availability of corporate email and organization data on mobile devices has influenced business immensely. The adoption of smartphones and tablets, such as the iPad™ in an enterprise raises challenges for information technology (IT) professionals. Corporate data that is used to exist within enterprise perimeter is now being easily carried in an employee's pocket or bag. While the proliferation of mobile devices in the enterprise is desirable in many ways, it also exposes sensitive data to additional threat vectors. Sensitive data from these devices can leak through multiple mediums—emails, web, ftp, wifi, 3G, etc. All of these factors together have posed multiple challenges to IT experts and made their job of securing corporate data more difficult.

SUMMARY

In one embodiment, a computer-implemented method is provided that includes intercepting a hypertext transfer protocol (HTTP) request comprising an electronic mail (email) sent from a mobile device using a wireless messaging protocol, then modifying the HTTP request by inserting a simple mail transfer protocol (SMTP) compliant header into an HTTP body of the HTTP request, the header comprising an identity of the mobile device to identify the mobile device to an email data loss prevention (DLP) system, and then forwarding the modified HTTP request to a server implementing the wireless messaging protocol, wherein the server forwards the email towards the email DLP system for the enforcement of one or more DLP policies on the email using the identity of the mobile device.

In one embodiment, the computer-implemented method also includes receiving an SMTP message from a mail server comprising the email sent from the mobile device, the email comprising the SMTP compliant header inserted into the HTTP body of the HTTP request, and associating a DLP incident with the identity of the mobile device.

In one embodiment, the computer-implemented method also includes receiving a SMTP message comprising the email sent from the mobile device, the email comprising the SMTP compliant header inserted into the HTTP body of the HTTP request, identifying the source device of the received SMTP message as the mobile device using the SMTP compliant header, and applying a DLP policy to the received SMTP message that is applicable to mobile devices.

In one embodiment, the computer-implemented method also includes receiving a SMTP message comprising the email sent from the mobile device, the email comprising the SMTP compliant header inserted into the HTTP body of the HTTP request, identifying a type of mobile device originating the received SMTP message using the SMTP compliant header, and applying a DLP policy to the received SMTP message that is applicable to the identified type of mobile device. In one embodiment, the wireless messaging protocol is Exchange ActiveSync.

In one embodiment, the computer-implemented method also includes extracting the identity of the mobile device from a command line or an HTTP header of the HTTP request. In one embodiment, the computer-implemented method also includes mapping the extracted identity of the mobile device from a first format to a second format prior to modifying the HTTP request.

In one embodiment of the invention, a non-transitory computer readable storage medium is provided that includes instructions that, when executed by a processor, cause the processor to perform a method that includes intercepting a hypertext transfer protocol (HTTP) request comprising an electronic mail (email) sent from a mobile device using a wireless messaging protocol, then modifying the HTTP request by inserting a simple mail transfer protocol (SMTP) compliant header into an HTTP body of the HTTP request, the header comprising an identity of the mobile device to identify the mobile device to an email data loss prevention (DLP) system, and then forwarding the modified HTTP request to a server implementing the wireless messaging protocol, wherein the server forwards the email towards the email DLP system for the enforcement of one or more DLP policies on the email using the identity of the mobile device.

In one embodiment of the invention, a system is provided that includes a mobile security server having a memory storing a source tagging engine, and a processor coupled to the memory to execute the source tagging engine to cause the intercepting of a hypertext transfer protocol (HTTP) request comprising an electronic mail (email) sent from a mobile device using a wireless messaging protocol, the modifying of the HTTP request by inserting a simple mail transfer protocol (SMTP) compliant header into an HTTP body of the HTTP request, the header comprising an identity of the mobile device to identify the mobile device to an email data loss prevention (DLP) system, and the forwarding of the modified HTTP request to a server implementing the wireless messaging protocol, wherein the server forwards the email towards the email DLP system for the enforcement of one or more DLP policies on the email using the identity of the mobile device. In another embodiment, the system also includes the DLP system to receive an SMTP message from a mail server comprising the email sent from the mobile device, the email comprising the SMTP compliant header inserted into the HTTP body of the HTTP request, and associating a DLP incident with the identity of the mobile device.

BRIEF DESCRIPTION OF THE DRAWINGS

The present invention will be understood more fully from the detailed description given below and from the accompanying drawings of various embodiments of the invention.

DETAILED DESCRIPTION

A system and method for source mobile device identification for data loss prevention for electronic mail are described. In the following description, numerous details are set forth. It will be apparent, however, to one of ordinary skill in the art having the benefit of this disclosure, that the present invention may be practiced without these specific details. In some instances, well-known structures and devices are shown in block diagram form, rather than in detail, in order to avoid obscuring the present invention. For example, the following description provides details for using Exchange ActiveSync and Exchange server. However, it would be clear to one of ordinary skill in the art that embodiments of the present invention also apply to other HTTP based wireless messaging protocols, and other types of SMTP mail servers.

Some portions of the detailed description that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "receiving", "analyzing", "displaying", "enabling", "identifying," "modifying" or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

The present invention also relates to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

Figure 1:
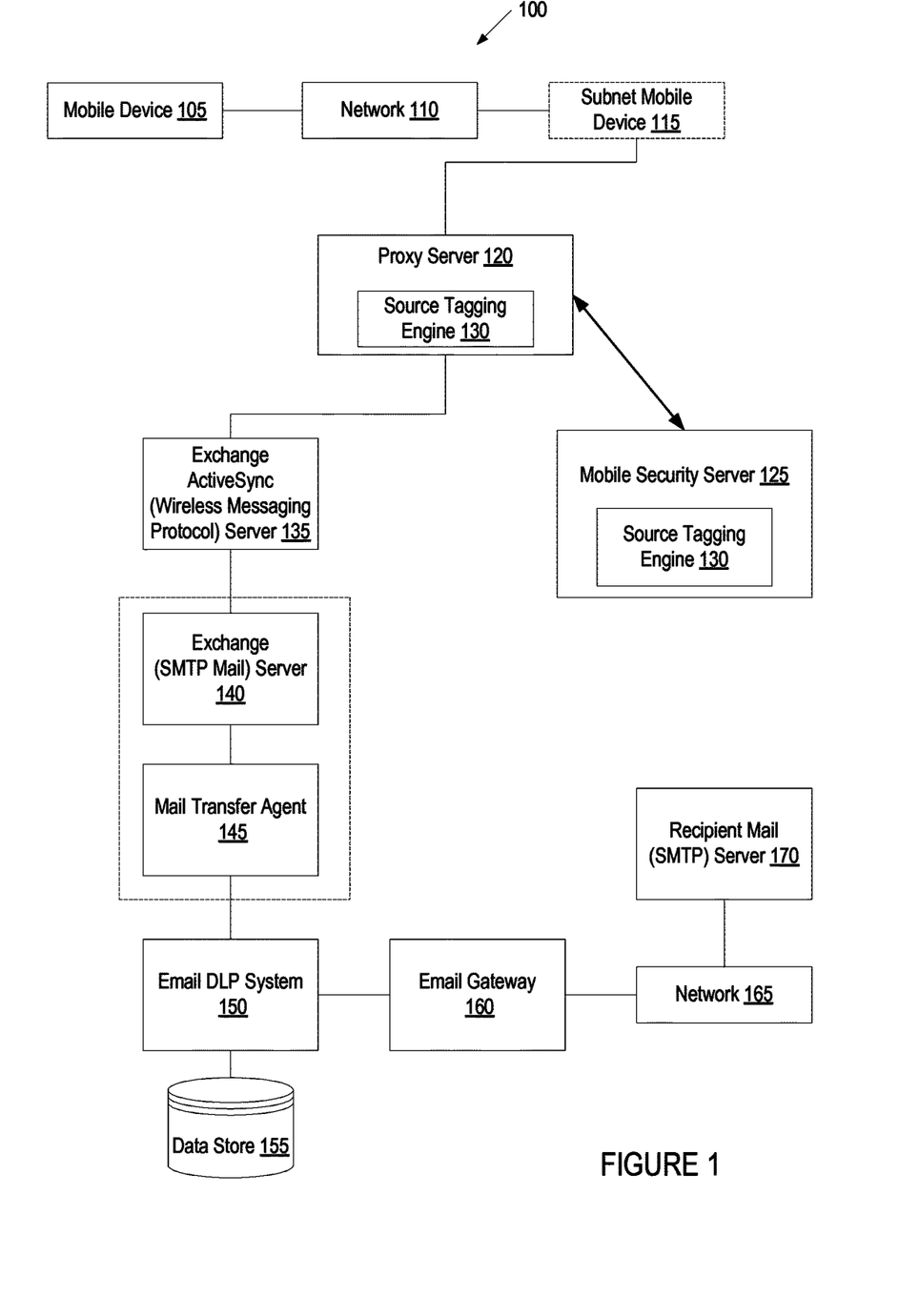
FIG. 1 illustrates an exemplary system architecture, in accordance with one embodiment of the present invention.

FIG. 1 illustrates an exemplary system architecture 100, in accordance with one embodiment of the present invention. The system architecture 100 includes a mobile device 105 that is associated with an organization, such as a corporation, government entity, school, or some other form of enterprise. In one embodiment, the organization has internal systems to handle electronic mail ("email"). The organization also implements a DLP system, that includes an email DLP component 150. In one embodiment, the email DLP component is configured to only inspect email for sensitive data that originates from within the organization and is bound for outside the organization. Thus, two employees of a corporation emailing each other would not be inspected, but one of those employees forwarding a piece of corporate email to his or her non-corporate account—such as a webmail, e.g. Gmail account—would be inspected.

The mobile device 105 may be a laptop, a mobile phone, a tablet computer, or any other mobile computing device that can be accessed by a user. The mobile device 105 runs an operating system (OS) that manages hardware and software of the mobile device 105. The OS may be, for example, Microsoft® Windows®, Android®, Apple's® iOS®, etc. One or more applications run on top of the OS and perform various operations that involve accessing, moving, or otherwise manipulating data residing in a data store included in, attached directly to, or networked with the mobile device 105. The applications typically include an email application configured to allow the user to send email from the user's organizational email account. In a real world organization, various different mobile devices would access the organization network and send email via the organization network.

In one embodiment, the email application interacts with a wireless messaging protocol client that enables the mobile device to send and receive email, and to synchronize email on the mobile device 105 with an email server. For example, if an organization uses Microsoft Exchange™ as their email server, then a mobile device having access to organizational email will implement an Exchange ActiveSync™ ("EAS") client.

The mobile device 105 communicates by wirelessly accessing a network 110, such as a wireless LAN connected to the Internet or some private network. In one embodiment, email sent from the mobile device 105 is in the form of an HTTP request. The HTTP request can encapsulate both the wireless messaging protocol and the text of the email. In one embodiment, email sent from the mobile device 105 to the network 110 is forced through the organizational infrastructure, for example by using a virtual private network (VPN). Thus, internally, the mobile device 105 can be mapped to a subnet mobile device 115 representing, for example, the internet protocol (IP) address of the mobile device on a VPN subnetwork.

In one embodiment, data transfer from the subnetwork including the subnet mobile device 115 is routed through a web proxy server 120. In one embodiment, the proxy server 120 can cache web request from the network 110 and provide antimalware and antivirus scanning. In one embodiment, the proxy server 120 also routes emails to a wireless messaging protocol server 135 configured to serve requests from the client on the mobile device 105. In one embodiment, the wireless messaging protocol server 135 is an EAS server.

The wireless messaging protocol server 135 implements the messaging protocol command in the HTTP request received from the mobile device 105. For example, the EAS command SendMail is used by an EAS server to receive Multipurpose Internet Mail Extensions (MIME)-formatted email messages from the mobile device 105. The EAS server would thus route such a message towards it's intended destination. Similarly a GetAttachment command would cause an EAS server to retrieve the appropriate email attachment from the EAS server.

The wireless messaging protocol server 135 may then pass the email to an SMTP server 140 and mail transfer agent (MTA) 145 that implement the SMTP protocol. Thus the email that originated as an HTTP request has the form of an SMTP message as it is forwarded from the MTA 145 to an email gateway 160. The email gateway 160 can be used, in conjunction with the MTA and other email infrastructures, to filter incoming and outgoing email messages and perform other email-related logging and analytics. In one embodiment, the organization network environment 100 includes an email DLP system 150 or component—that is part of a larger enterprise DLP system—that is configured to enforce DLP policies applied to outbound emails. By locating the email DLP system 150 between the MTA 145 and the organization's email gateway 160 only the emails bound for outside the organization's network are inspected, since internal emails will be routed on the organizations network by the SMTP or Exchange server 140.

From the email gateway 160 the SMTP message containing the email sent from the mobile device 105 leaves the internal network and traverses another network 165—such as the Internet—to reach the SMTP server 170 of the recipient of the email. As mentioned above, when the email sent from the mobile device 105 reaches the email DLP system 150, it is formatted as an SMTP message. The SMTP message will include headers identifying the sender and the recipient, but the identity of the mobile device 105 that was contained in the HTTP headers will be lost during the conversion from the HTTP request to the SMTP message, since the HTTP headers are stripped out during SMTP conversion. Thus, the email DLP system 150, and consequently the IT professionals using the DLP systems of the organization, would not know what device the sender of the email used to send the email.

In one embodiment, the web proxy server 120 is configured to route all HTTP traffic to a mobile security server 125. In one embodiment, the mobile security server 125 scans content uploaded to the web via web requests, such as file uploading, blog updates, social media updates and so on. Furthermore, the mobile security server 125 can identify which HTTP requests are email, for example by examining the headers and the body of the received HTTP request. In one embodiment, by the examining the URI, content type, user agent, and/or email sender header fields associated with the wireless messaging protocol, such as EAS.

In one embodiment, the mobile security server 125 includes a source tagging engine 130. In one embodiment, the source tagging engine inserts an SMTP compliant header into the HTTP body of each HTTP request that is identified as email. In one embodiment, an SMTP compliant header is a key-value pair separated by a colon, or some other syntax.

The inserted SMTP compliant header can identify the mobile device 105 as the source of the email by device name, IP address, subnet IP address, MAC address, or other such device identity, or a combination of these HTTP headers. In another embodiment, the inserted SMTP compliant header can identify that the email was sent from a mobile device, or from a specific type of mobile device (e.g., iPad, iPhone) without identifying the specific mobile device from which the email originated.

Figure 2:
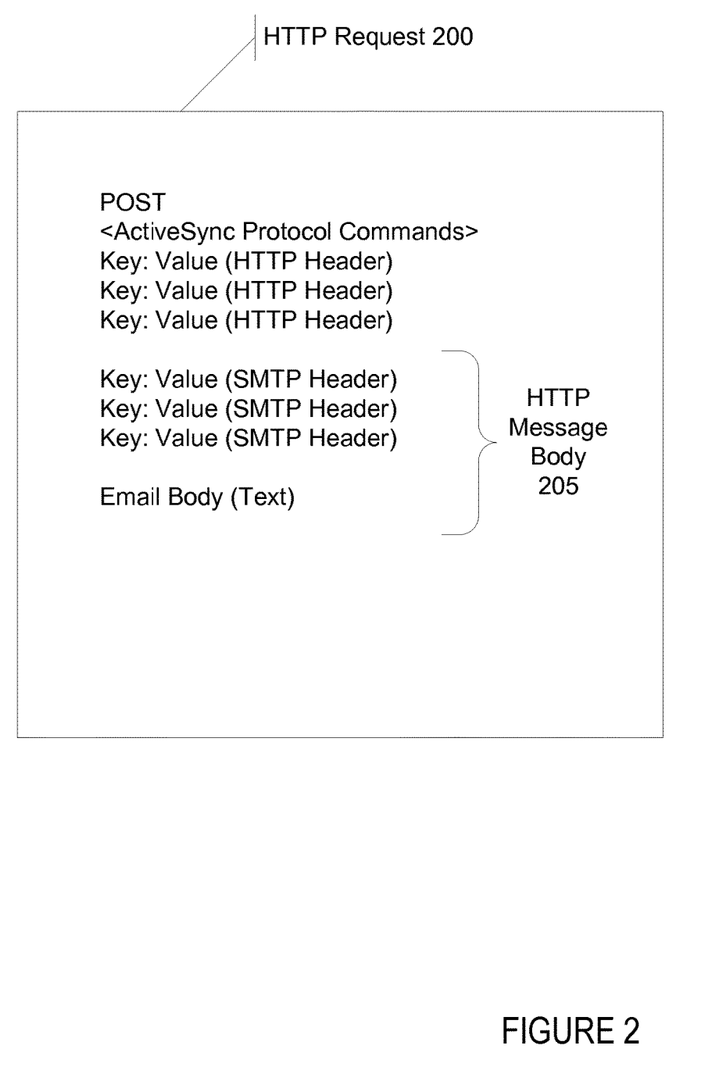
FIG. 2 is a sample HTTP POST request, in accordance with one embodiment of the present invention.

FIG. 2 illustrates a sample EAS email message in the form of an HTTP request 200, but any protocol running on top of HTTP would be similar. EAS uses the HTTP POST request to send email. The first line of the HTTP request 200 includes the EAS commands—such as the SendMail command—that tells the EAS server how to handle the request. Furthermore, the first line can also include the identification of the mobile device or the subnet representation of the mobile device, or both.

In one embodiment, the HTTP request also includes one or more HTTP headers that include meta-data about the HTTP request 200, such as the language of the HTTP request 200, the length of the HTTP request 200, the connection type, the content type, the user agent, and so on. The HTTP request also includes an HTTP message body 205. In one embodiment, the HTTP body 205 includes one or more SMTP compliant headers to be used by the SMTP mail servers that process the email further along its transmission, as discussed above.

The SMTP headers include key:value pairs such as From: email address, To: email address, Date: today, and so on. The text of the email body (the actual text of the email message) is also included in the HTTP body 205. However, the standard SMTP headers generated by EAS or other mobile wireless messaging protocols do not include an identification of the originating device or the originating device type.

Thus, as discussed above, in one embodiment, the source tagging engine 130 inserts an additional SMTP header into the HTTP message body 205 of the HTTP request 200 that identifies the source device of the email, or the source device type. In one embodiment, the source tagging engine 130 parses the first line of the HTTP request 200—the wireless messaging protocol command—and extracts the identity of the HTTP request originating device from the first line of the HTTP request 200. In another embodiment, the source tagging engine 130 parses the HTTP headers to extract the identity of the HTTP request originating device.

The extracted identity of the email originating device may be in various formats, such as hostname, device name, IP address, subnet IP address, MAC address, and so on. In one embodiment, the extracted identity of the originating device is inserted as an SMTP compliant header in the same format it was extracted. For example, if the extracted identity information is "Bob's iPad," the SMTP header inserted can be "SourceDevice: Bob's iPad." In one embodiment, the inserted SMTP-compliant headers are labeled to distinguish them from the standard SMTP headers. For example, all such headers can begin with "X-" (e.g., "X-SourceDevice: Bob's iPad") or some other signifier.

In other embodiments, the extracted identity of the originating device is converted to a different format before insertion. For example, if the extracted identity information was a VPN subnet IP address, the source tagging engine 130 can map the IP address to a device name or a device type.

In yet other embodiment, both the original extracted identity format, and one or more other formats representing the identity of the originating device can be inserted as separate SMTP headers, or even in a single SMTP header.

In addition to, or instead of, the SMTP headers discussed above, in one embodiment an SMTP header is inserted that identifies the type of the originating mobile device. Such headers can have values such as "mobile device," "tablet," "iPad," and so on. In such an embodiment, the source tagging engine 130 can map the extracted identity information to one of several device types.

In FIG. 1, the source tagging engine 130 is shown as residing on both the mobile security server 125 and the proxy server 120. However, this is merely to illustrate various alternatives for the location of the source tagging engine 130, such as either on the mobile security server 125 or the proxy server 120. In other embodiments, the source tagging engine 130 can be implemented anywhere in the transmission flow between the mobile device 105 and the wireless messaging protocol—e.g, EAS—server 135.

Figure 3:
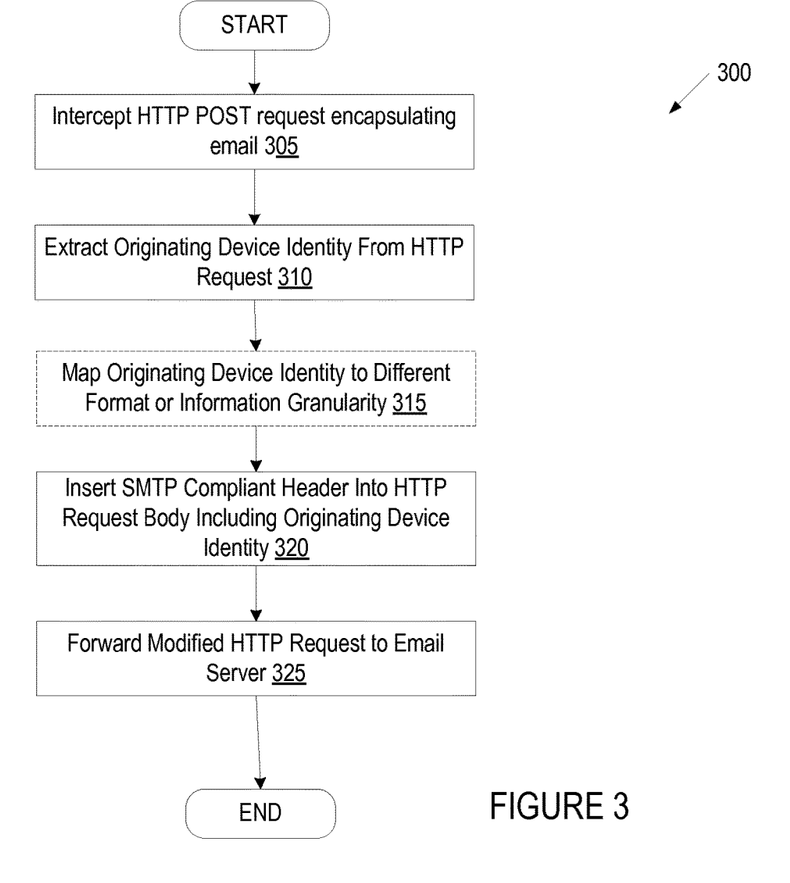
FIG. 3 is a flow diagram illustrating one embodiment for a method of modifying an HTTP request of a wireless messaging protocol.

FIG. 3 is a flow diagram illustrating one embodiment for a method 300 of mobile device source tagging. The method 300 is performed by processing logic that may comprise hardware (circuitry, dedicated logic, etc.), software (such as is run on a general purpose computer system or a dedicated machine), or a combination of both. Method 300 may be performed, for example, by the source tagging engine 130 or by the proxy server 120 of FIG. 1.

Referring to FIG. 3, at block 305 an HTTP POST request is intercepted. The HTTP POST request encapsulates an email according to a wireless messaging protocol, such as EAS. The HTTP request originated from a mobile device whose user is sending an email from an organization email account. The HTTP request can be intercepted at any point in transmission from the mobile device to the server implementing the wireless messaging protocol, such as an EAS server. In one embodiment, the HTTP request is intercepted after it is forced onto the organization's network via a VPN.

At block 310, the device identity of the originating mobile device is extracted from the HTTP POST request. As set forth above, the device identity may be included in the first line of the HTTP POST request, or in one or more HTTP headers. In one embodiment, at block 315, the extracted mobile device identity is mapped to a different format (e.g. subnet IP address to device name), or is mapped to a different level of information granularity (e.g., specific device to mobile device type), or both.

At block 320, the HTTP POST request is modified by the insertion of an SMTP compliant header into the HTTP body of the HTTP POST request that includes the extracted mobile device identity, a mapped representation of the mobile device identity, an identification of the device type of the mobile device, or a combination of some or all of the above. Then, at block 325, the modified HTTP POST request is forwarded to an email server. Initially the email server implements the wireless messaging protocol (such as an EAS server) and ultimately to an email server that converts the email encapsulated in the HTTP POST request to a SMTP protocol, such as an Exchange server and an MTA, or some other type of SMTP server. When the email is converted to an SMTP message, information previously contained in the HTTP command line and the HTTP headers will have been stripped from the email.

Figure 4A:
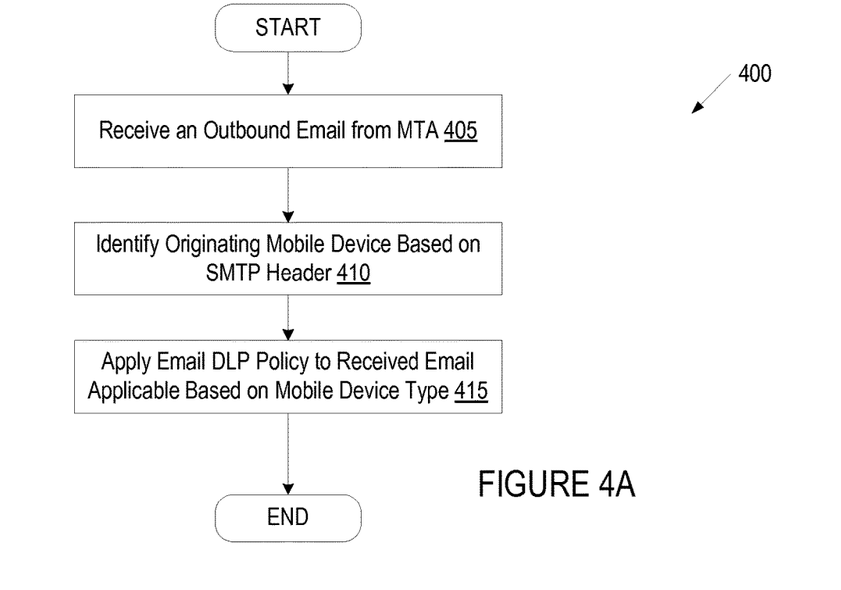
FIG. 4A is a flow diagram illustrating one embodiment for a method of applying DLP policies to email from mobile devices.

FIG. 4A is a flow diagram illustrating one embodiment for a method 400 of applying DLP policies based on device type. The method 400 is performed by processing logic that may comprise hardware (circuitry, dedicated logic, etc.), software (such as is run on a general purpose computer system or a dedicated machine), or a combination of both. Method 400 may be performed, for example, by the email DLP system 150 of FIG. 1.

Referring to FIG. 4A, at block 405 an outbound email originating within the organization and bound for an email address outside of the organization is received from an MTA. At block 410, the special SMTP header or headers that were inserted during mail transmission according to a process like the method described with reference to FIG. 3 are parsed. These special SMTP header or headers identify a mobile device that originated the email, identify that the email is from a mobile device, identify that the email is from a certain type of mobile device, or all of the above.

At block 415, having identified that the email originated from a mobile device or from a certain type of mobile device, one or more DLP policies are applied to the email that are associated with mobile devices, or with the specific type of mobile device that originated the email. Without such a header, there would be no way to know what device originated the received email.

For example, violations of DLP policies by mobile devices may include more aggressive remediation rules. Where a rule violation by a non-mobile device (e.g. sending customer data) may be remediated by a normal priority event, the same rule violation for a mobile device may trigger device locking, manager notification, a high severity event, or a combination of these or other DLP policy violation remediation actions.

Figure 4B:
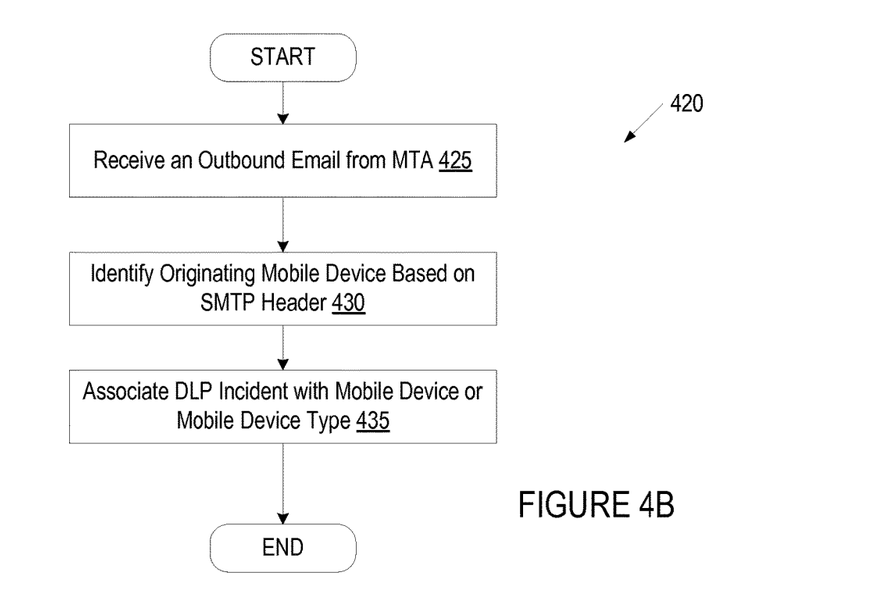
FIG. 4B is a flow diagram illustrating one embodiment for a method of associating a email DLP incident with a mobile device.

FIG. 4B is a flow diagram illustrating one embodiment for a method 420 of associating DLP incidents with mobile devices. The method 420 is performed by processing logic that may comprise hardware (circuitry, dedicated logic, etc.), software (such as is run on a general purpose computer system or a dedicated machine), or a combination of both. Method 420 may be performed, for example, by the email DLP system 150 of FIG. 1.

Referring to FIG. 4B, at block 425 an outbound email originating within the organization and bound for an email address outside of the organization is received from an MTA. At block 430, the special SMTP header or headers that were inserted during mail transmission according to a process like the method described with reference to FIG. 3 are parsed. These special SMTP header or headers identify a mobile device that originated the email, identify that the email is from a mobile device, identify that the email is from a certain type of mobile device, or all of the above.

A DLP policy is then applied to the email. The resulting DLP incident (e.g. identifying customer data or registered confidential data in the email) is then associated with the identity of the originating mobile device, the fact that the originating device was a mobile device, a specific type of mobile device, or all of the above at block 435. In this manner, the organization can identify which mobile devices have access to what information. These identified devices may then be targeted for additional policies and security requirements, such as encryption and so on.

In the embodiments described above, the mobile device is sometimes shown and discussed as tunneling in to the organization network using VPN into a VPN subnet. However, in other embodiment, the mobile device originating an email message using a wireless messaging protocol can transmit the email to a server implementing the wireless messaging protocol without the use of VPN.

Furthermore, in the description above, references to the HTTP protocol and its requests, formats, and headers are equally applicable to the HTTPS protocol, the secure version of the HTTP protocol. Thus, any reference to HTTP in this application including the claims includes HTTPS, and the two are used interchangeably. Alternatively, a reference to HTTP can be interpreted as HTTP or HTTPS.

Figure 5:
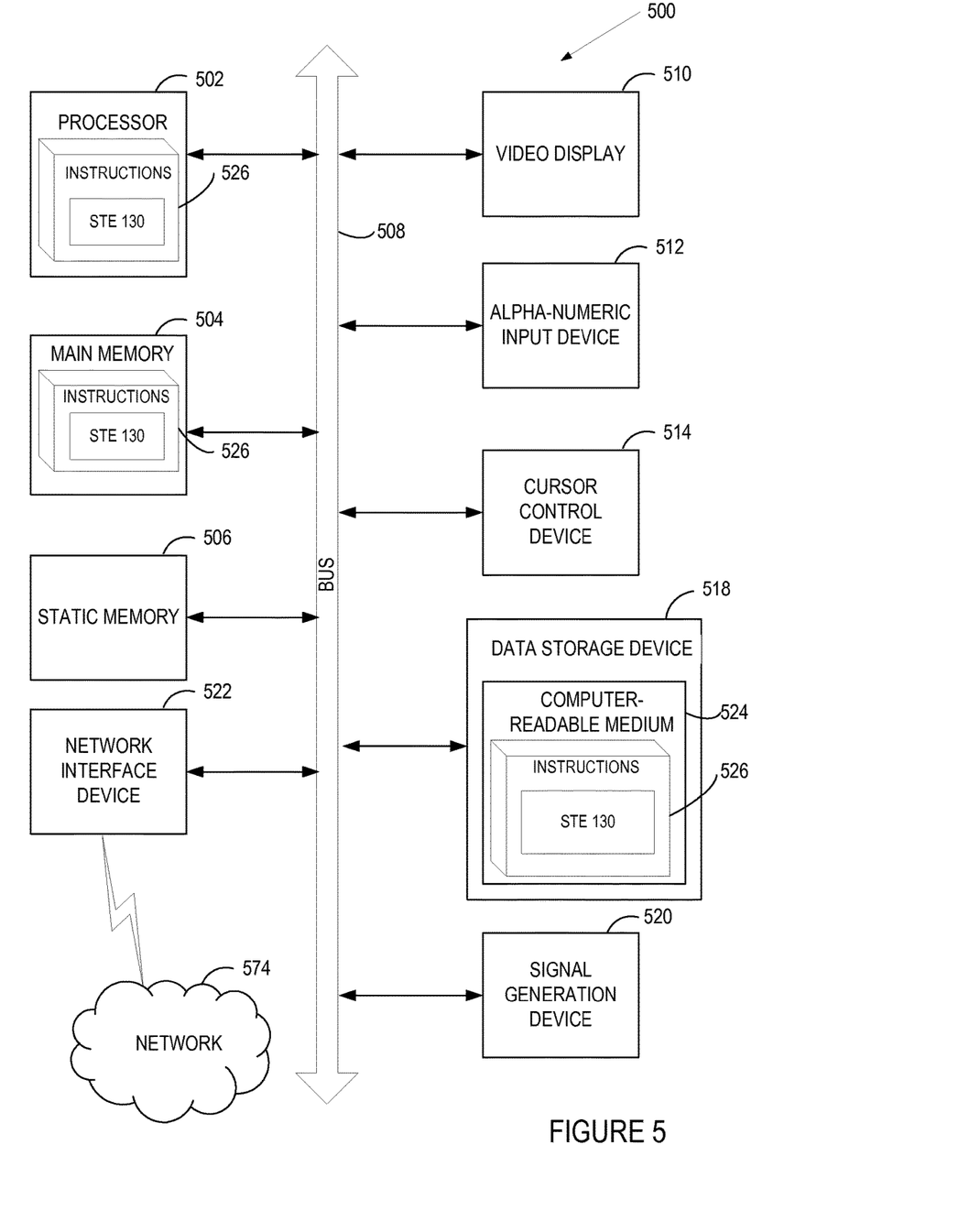
FIG. 5 is a block diagram of an exemplary computer system that may perform one or more of the operations described herein.

FIG. 5 illustrates a diagrammatic representation of a machine in the exemplary form of a computer system 500 within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server or a client machine in client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 500 includes a processing device (processor) 502, a main memory 504 (e.g., read-only memory (ROM), flash memory, dynamic random access memory (DRAM) such as synchronous DRAM (SDRAM) or Rambus DRAM (RDRAM), etc.), a static memory 506 (e.g., flash memory, static random access memory (SRAM), etc.), and a data storage device 518, which communicate with each other via a bus 508.

Processor 502 represents one or more general-purpose processing devices such as a microprocessor, central processing unit, or the like. More particularly, the processor 502 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor 502 may also be one or more special-purpose processing devices such as an application specific integrated circuit (ASIC), a field programmable gate array (FPGA), a digital signal processor (DSP), network processor, or the like. The processor 502 is configured to execute instructions 526 for performing the operations and steps discussed herein.

The computer system 500 may further include a network interface device 522. The computer system 500 also may include a video display unit 510 (e.g., a liquid crystal display (LCD) or a cathode ray tube (CRT)), an alphanumeric input device 512 (e.g., a keyboard), a cursor control device 514 (e.g., a mouse), and a signal generation device 520 (e.g., a speaker).

The data storage device 518 may include a computer-readable storage medium 524 on which is stored one or more sets of instructions 526 (e.g., software) embodying any one or more of the methodologies or functions described herein. The instructions 526 may also reside, completely or at least partially, within the main memory 504 and/or within the processor 502 during execution thereof by the computer system 500, the main memory 504 and the processor 502 also constituting computer-readable storage media. The instructions 526 may further be transmitted or received over a network 574 via the network interface device 522.

In one embodiment, the instructions 526 include instructions for a source tagging engine, such as source tagging engine 130 of FIG. 1, and or a software library containing methods that call a ML manager. While the computer-readable storage medium 524 is shown in an exemplary embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present invention. The term "computer-readable storage medium" shall accordingly be taken to include, but not be limited to, solid-state memories, optical media, and magnetic media.

It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A method comprising:
    intercepting a hypertext transfer protocol (HTTP) request comprising an electronic mail (email) sent from a mobile device using a wireless messaging protocol;
    modifying, by a processing device, the HTTP request by inserting a simple mail transfer protocol (SMTP) compliant header into an HTTP body of the HTTP request, the SMTP compliant header comprising an identity of the mobile device to identify the email as originating from the mobile device to an email data loss prevention (DLP) system; and
    forwarding the modified HTTP request to a server, wherein the server converts the HTTP request to an SMTP message that includes the email and the SMTP compliant header, and forwards the SMTP message towards the email DLP system for the enforcement of one or more DLP policies on the SMTP message based on an inspection of data of the SMTP message, a notification triggered when the inspected data comprises a particular type of data, and an identification from the SMTP compliant header that the email originated from the mobile device.

2. The method of claim 1, further comprising:
    receiving the SMTP message from a mail server comprising the email sent from the mobile device, the SMTP message comprising the SMTP compliant header that was inserted into the HTTP body of the HTTP request; and
    associating a DLP incident with the identity of the mobile device.

3. The method of claim 1, further comprising:
    receiving the SMTP message comprising the email sent from the mobile device, the SMTP message comprising the SMTP compliant header that was inserted into the HTTP body of the HTTP request;
    identifying the source device of the received SMTP message as the mobile device using the SMTP compliant header; and
    applying a DLP policy to the received SMTP message that is applicable to mobile devices.

4. The method of claim 1, further comprising:
receiving the SMTP message comprising the email sent from the mobile device, the email comprising the SMTP compliant header that was inserted into the HTTP body of the HTTP request;
identifying a type of mobile device originating the received SMTP message using the SMTP compliant header; and
applying a DLP policy to the received SMTP message that is applicable to the identified type of mobile device.

5. The method of claim 1, wherein the wireless messaging protocol comprises Exchange ActiveSync.

6. The method of claim 1, further comprising:
extracting the identity of the mobile device from a command line or an HTTP header of the HTTP request.

7. The method of claim 6, further comprising:
mapping the extracted identity of the mobile device from a first format to a second format prior to modifying the HTTP request.

8. A system comprising:
a memory; and
a processing device operatively coupled to the memory to:
intercept a hypertext transfer protocol (HTTP) request comprising an electronic mail (email) sent from a mobile device using a wireless messaging protocol;
modify the HTTP request by inserting a simple mail transfer protocol (SMTP) compliant header into an HTTP body of the HTTP request, the SMTP compliant header comprising an identity of the mobile device to identify the email as originating from the mobile device to an email data loss prevention (DLP) system; and
forward the modified HTTP request to a server, wherein the server converts the HTTP request to an SMTP message that includes the email and the SMTP compliant header, and forwards the SMTP message towards the email DLP system for the enforcement of one or more DLP policies on the SMTP message based on an inspection of data of the SMTP message, a notification triggered when the inspected data comprises a particular type of data, and an identification from the SMTP compliant header that the email originated from the mobile device.

9. The system of claim 8, wherein the processing device is further to:
receive the SMTP message from a mail server comprising the email sent from the mobile device, the SMTP message comprising the SMTP compliant header that was inserted into the HTTP body of the HTTP request; and
associate a DLP incident with the identity of the mobile device.

10. The system of claim 8, wherein the processing device is further to:
receive the SMTP message comprising the email sent from the mobile device, the SMTP message comprising the SMTP compliant header that was inserted into the HTTP body of the HTTP request;
identify the source device of the received SMTP message as the mobile device using the SMTP compliant header; and
apply a DLP policy to the received SMTP message that is applicable to mobile devices.

11. The system of claim 8, wherein the processing device is further to:
receive the SMTP message comprising the email sent from the mobile device, the email comprising the SMTP compliant header that was inserted into the HTTP body of the HTTP request;
identify a type of mobile device originating the received SMTP message using the SMTP compliant header; and
apply a DLP policy to the received SMTP message that is applicable to the identified type of mobile device.

12. The system of claim 8, wherein the processing device is further to:
extract the identity of the mobile device from a command line or an HTTP header of the HTTP request.

13. The system of claim 12, wherein the processing device is further to:
map the extracted identity of the mobile device from a first format to a second format prior to modifying the HTTP request.

14. The method of claim 1, wherein the enforcement of one or more DLP policies on the email in response to identifying that the email originated from the mobile device is different than an enforcement of one or more DLP policies on the email in response to identifying that the email did not originate from the mobile device.

15. A non-transitory computer readable storage medium including instructions that, when executed by a processing device, cause the processing device to perform operations comprising:
intercepting a hypertext transfer protocol (HTTP) request comprising an electronic mail (email) sent from a mobile device using a wireless messaging protocol;
modifying the HTTP request by inserting a simple mail transfer protocol (SMTP) complaint header into an HTTP body of the HTTP request, the SMTP complaint header comprising an identity of the mobile device to identify the email as originating from the mobile device to an email data loss prevention (DLP) system; and
forwarding the modified HTTP request to a server, wherein the server converts the HTTP request to an SMTP message that includes the email and the SMTP complaint header, and forwards the SMTP message towards the email DLP system for the enforcement of one or more DLP policies on the SMTP message based on an inspection of data of the SMTP message, a notification triggered when the inspected data comprises a particular type of data, and an identification from the SMTP compliant header that the email originated from the mobile device.

16. The non-transitory computer readable storage medium of claim 15, wherein the operations further comprise:
associating a DLP incident caused by applying the email DLP policy with the identity of the mobile device.

17. The non-transitory computer readable storage medium of claim 15, wherein the operations further comprise:
identifying a mobile device type of the mobile device using the SMTP compliant header; and
applying an email DLP policy to the received email that is specific to the identified mobile device type.

18. The non-transitory computer readable storage medium of claim 15, wherein the wireless messaging protocol comprises Exchange ActiveSync.

* * * * *